US009561694B2

(12) United States Patent
Ingram et al.

(10) Patent No.: US 9,561,694 B2
(45) Date of Patent: Feb. 7, 2017

(54) FAILURE TOLERANT TIRE INFLATION SYSTEM

(71) Applicants: Airgo IP, LLC, Edmond, OK (US); Anthony L. Ingram, Edmond, OK (US)

(72) Inventors: Anthony L. Ingram, Guthrie, OK (US); Marvin L. Stone, Stillwater, OK (US); Kent J. Dieball, Stillwater, OK (US)

(73) Assignees: Airgo IP, LLC, Oklahoma City, OK (US); Anthony L. Ingram, Edmond, OK (US)

( * ) Notice: Subject to any disclaimer, the term of this patent is extended or adjusted under 35 U.S.C. 154(b) by 225 days.

(21) Appl. No.: 14/477,580

(22) Filed: Sep. 4, 2014

(65) Prior Publication Data
US 2016/0068033 A1 Mar. 10, 2016

(51) Int. Cl.
*B60C 23/00* (2006.01)
(52) U.S. Cl.
CPC .................................. *B60C 23/003* (2013.01)
(58) Field of Classification Search
CPC ..... B60C 23/003; B60C 23/007; B60C 23/009
See application file for complete search history.

(56) References Cited

U.S. PATENT DOCUMENTS 2,693,841 A * 11/1954 Webster, Jr. .......... B60C 23/003
137/226
4,387,931 A * 6/1983 Bland ................... B60C 23/007
152/416
4,418,737 A 12/1983 Goodell et al.
(Continued)

FOREIGN PATENT DOCUMENTS

| GB | WO 2015176870 A1 * | 11/2015 | ........... B60C 23/003 |
| KR | 1020040023694 A | 3/2004 | |
| WO | 2016009342 A1 | 1/2016 | |

OTHER PUBLICATIONS

Notification of Transmittal of the International Search Report and the Written Opinion of the International Searching Authority, or the Declaration, International Search Report and Written Opinion of the International Searching Authority in corresponding International Application No. PCT/IB2015/055309, mailed Dec. 2, 2015, 21 pages.

*Primary Examiner* — Kip T Kotter
(74) *Attorney, Agent, or Firm* — Holland & Knight LLP; Richard E. Lyon, Jr.

(57) ABSTRACT

A failure tolerant tire inflation system for supplying pressurized air from an onboard source to the vehicle tires in the event of a pressure drop in one or more of the tires below a predetermined level. The system includes a tire inflation valve communicable with the source of pressurized air, a tire selector valve assembly for selectively communicating air from the tire inflation valve with the vehicle tires, a plurality of valve assemblies each communicating with at least one tire and selectively communicating with the tire selector valve assembly. A controller selectively activates and deactivates the tire inflation valve and valve assemblies to sequentially check the pressure in the tires and direct air to any underinflated tire. A transducer is provided for detecting the tire pressure levels upon the opening of the valve assembly communicating with that tire and communicating the underinflated condition to the controller.

22 Claims, 6 Drawing Sheets

(56) References Cited

U.S. PATENT DOCUMENTS

| | | | | |
|---|---|---|---|---|
| 4,640,331 | A * | 2/1987 | Braun | B60C 23/003 |
| | | | | 137/224 |
| 4,641,698 | A * | 2/1987 | Bitonti | B60C 23/003 |
| | | | | 137/223 |
| 5,180,456 | A * | 1/1993 | Schultz | B60C 23/003 |
| | | | | 141/1 |
| 5,544,688 | A * | 8/1996 | Freigang | B60C 23/003 |
| | | | | 137/224 |
| 6,144,295 | A | 11/2000 | Adams et al. | |
| 6,401,743 | B1 * | 6/2002 | Naedler | B60C 23/003 |
| | | | | 137/224 |
| 6,594,566 | B1 | 7/2003 | Skoff | |
| 7,201,066 | B1 | 4/2007 | Stone et al. | |
| 2010/0147387 | A1 * | 6/2010 | Medley | B60C 23/003 |
| | | | | 137/1 |
| 2011/0175716 | A1 * | 7/2011 | Medley | B60C 23/002 |
| | | | | 340/442 |
| 2013/0276902 | A1 * | 10/2013 | Medley | B60C 23/003 |
| | | | | 137/12 |
| 2013/0282232 | A1 * | 10/2013 | Medley | B60C 23/003 |
| | | | | 701/34.4 |
| 2015/0101702 | A1 * | 4/2015 | Dean | B60C 23/003 |
| | | | | 141/4 |

* cited by examiner

FAILURE TOLERANT TIRE INFLATION SYSTEM

CROSS-REFERENCE TO RELATED APPLICATIONS

This application claims the benefit of U.S. Provisional Patent Application No. 62/024,921, filed Jul. 15, 2014 entitled "Failure Tolerant Tire Inflation System."

BACKGROUND OF THE INVENTION

The present invention relates to onboard tire inflation systems for automatically maintaining the inflation pressure of the pneumatic tires on both non-powered and powered axles of moving vehicles such as tractor trailers and tractors.

Onboard automatic tire inflation systems are currently available for use on trucks and other vehicles. Such systems have been successfully used in non-powered vehicle axle assemblies such as on tractor trailers (see, e.g., U.S. Pat. Nos. 6,105,645 and 7,418,989) and more recently on powered axle assemblies (see, e.g., U.S. Pat. No. 7,896,045). Such systems deliver make-up air to a vehicle tire in the event that the tire is punctured or begins to lose air for other reasons. The disclosures of the above identified patents are incorporated herein by reference.

By way of example, an onboard system for maintaining a predetermined pressure in each of the tires of a non-powered truck tandem axle assembly is currently available from Airgo, Inc. of Edmond, Okla. The Airgo unit includes a tire inflation system which delivers compressed air from an onboard compressor (e.g., the compressor used for supplying air to the truck brakes) to the tires through the interior of the tandem axle, or a tube extending through the axle, in the event that a leak occurs in any of the four tandem axle tires. The Airgo unit also includes: a pair of rotary seals provided proximate the outer ends of the non-powered tandem axle; a set of air lines extending from the rotary seals for delivering air from the interior of the axle, through the rotary seals, to each of the four tires; check valves provided in the air lines for preventing reverse air flow from the tires to the axle; and an indicator light which alerts the operator that a leak has developed. The system controls the make-up air flow in accordance with the operating pressure required by the tires. For most tandem truck axles, the automatic inflation system will typically be operable for providing a sufficient make-up air flow to maintain a tire pressure of at least 90 psig and more preferably at least 95 psig. Automatic tire inflation systems of this type are described in U.S. Pat. Nos. 6,105,645 and 7,418,989 identified above.

Automatic tire inflation systems are susceptible to failures, however, which may result in deflation of one or more of the tires served by the system. A failure of a pressure regulator utilized in the system or of a valve or air conduit between the regulator to the tires can result in a loss of air at the failure and through the pneumatic conveyance. The installation of a check valve at the tire would prevent flow from the tire in the event of such a failure, while allowing the tire to be inflated as necessary. Such a valve, however, would prevent the tire from being deflated when necessary and the ability to deflate a tire in automatic tire inflation systems is a desirable feature. Tires may be inflated to the proper pressure when cold, but warming of the tire after inflation can result in pressures that are too high. A similar effect occurs when the vehicle undergoes changes in altitude. Tires inflated to proper pressures at low altitude result in excessive tire pressures when a vehicle travels to a high altitude. Deflation of tires to the proper inflation level prevents the operation of the tires in an over-inflated condition and may be useful in balancing loads or adjusting to wind or, if off road, adjusting to soil conditions.

Therefore, it would be highly desirable to be able to develop an automatic tire inflation system that would prevent the tires from being fully deflated in the event of a system failure while allowing for regulated tire deflation to maintain the tires at their proper operating pressure. Such a system is provided by the present invention.

SUMMARY OF THE INVENTION

Briefly, the present invention provides a tire inflation system for maintaining the inflation pressure of the pneumatic tires on both non-powered and powered axles of moving vehicles in the event of a loss of pressure in one or more of the tires or a failure of the system. In one aspect of the invention, a pressure regulator communicates with an onboard supply of pressurized air for delivering air from the source to an air storage vessel at a pressure level preferably at or slightly below the maximum operating pressure of the tires. The storage vessel communicates the air to a tire inflation valve that in turn selectively communicates the air to the individual vehicle tires via a tire selector valve assembly, a plurality of rotary union assemblies and a plurality of pressure difference reduction valve assemblies, each of which is associated with one or more of the tires. The tire selector valve assembly also is in selective fluid communication with a tire deflation valve that preferably is in fluid communication with a low pressure sink and a low pressure regulator. The storage vessel, tire inflation valve, tire selector valve assembly, the deflation valve and the low pressure sink are all in communication with and controlled by a tire pressure controller. The tire pressure controller preferably periodically sequences from one tire to the next to check the pressure in each of the tires associated with the tire selector valve assembly and then inflates or deflates any of the tires as needed through a pressure difference reduction valve assembly to maintain all of the tires at their desired operating pressure.

In another aspect of the invention, the tire selector valve assembly can comprise a gallery of valves communicating with a tire inflation valve through a common cavity wherein each valve in the gallery communicates with one or more tires through an associated pressure difference reduction valve assembly. The individual pressure difference reduction valve assemblies are configured to open upon sensing a tire inflation pressure level that preferably is well above the minimum tire operating pressure for tire(s) and to close in response to sensing a pressure below that level.

In another aspect of the invention, the sequencing by the controller of the individual valves in the tire selector valve assembly intermittently communicates each of those valves with one of the tires through an open pressure difference reduction valve assembly, first to measure the air pressure within the tires, then to allow flow at the desired operating pressure into the tire if the tire is deflated or from the tire back to the tire selector valve assembly if the tire is over inflated and thereafter to maintain the tire at the desired pressure level.

In another aspect of the invention, the pressure levels in the tires is measured by directing air from the air storage vessel to the tire selector valve assembly by modulating the tire inflation valve in an ON/OFF manner with the ON time constituting fill time and being related to the amount of air needed to raise the pressure level in an interior cavity of a tire selector valve assembly to a predetermined pressure level to effect the opening of one of a plurality of pressure difference reduction valve assemblies, each of which is associated with at least one of the tires and most preferably with only one tire. Preferably, the pressure difference reduction valve assemblies are each set to open at a pressure well above the minimum tire operating pressure. Upon the opening of a selected pressure difference reduction valve assembly, the tire selector valve assembly communicates with the associated tire(s) through the open valve assembly whereupon the tire pressure level can be measured and transmitted to a controller.

In another aspect of the invention, the pressure level within each of the tires is ascertained and transmitted as the sequencing by the controller continues through all of the tires. In the event the controller detects a low pressure in one of the tires during the sequencing, the controller can open the tire inflation valve, close the deflation valve and recharge the internal cavity in the tire selector assembly with the higher pressure air from the high pressure regulator and then open and modulate the inflation valve so as to bring the pressure within the cavity of the tire selector valve assembly to the desired tire operating pressure. The particular tire selector valve within the assembly that is associated with the underinflated tire can then be opened by the controller and the air in the charged cavity will flow therefrom through an associated open pressure difference reduction valve assembly and into the tire. The underinflated tire is periodically inflated as the sequencing between tires continues until a desired tire pressure level is reached. The fill time for each tire can be set by the controller and if only a single underinflated tire is detected, the fill time can be extended until the tire is inflated to the desired pressure without further sequencing.

In another aspect of the invention, the back flow is preferably regulated by communicating the tire selector valve assembly with a deflation valve, the deflation valve with a low pressure sink and providing the low pressure sink with a low pressure regulator at the outlet end thereof which preferably is set at a pressure level slightly above the minimum operating pressures for the tires. Thus, when the controller senses back flow from the tire to and through an open pressure difference reduction valve assembly associated with an overinflated tire, the controller can close the inflation valve and open the deflation valve, conveying the air to the low pressure sink which is maintained at a safe pressure level. The deflation process is ended when the tire reaches the desired operating pressure, whereupon the deflation valve can be closed, preventing further evacuation of the tire. Because the pressure difference reduction valve assemblies are preferably set to close upon sensing a predetermined pressure level above the safe minimum operating pressure of the tire and the tire is then isolated, in the event of a system failure, a safe pressure level is retained within the tire.

In still another aspect of the invention, each of the pressure difference reduction valve assemblies can comprise an unloading valve, a pilot operated check valve and preferably a restrictor orifice wherein air flow between the tire selector valve assembly and the associated tire(s) flows through the restrictor orifice and the check valve to the tire(s). A small portion of the air from the tire selector valve is diverted within the pressure difference reduction valve assemblies to and through the unloading valve to the check valve. The unloading valve will open the associated check valve at a relatively low pressure level relative to the desired tire operating pressure within the tire, thereby allowing the pressure difference reduction valve assembly to open and close at predetermined pressure levels well below the desired tire pressure level.

In another aspect of the invention, a pressure transducer is associated with the tire selector valve assembly to measure the pressure within a tire upon the opening of the associated pressure difference reduction valve assembly and communicates that pressure level to the controller for the selective actuation of the tire inflation and deflation valves.

In yet another aspect of the present invention, the tire selector valve assembly, tire inflation valve and tire deflation valve and at least substantial portions of the conduits therebetween are formed within solid blocks of material, preferably aluminum, which are secured together and mounted on and electrically communicated with a circuit board defining the tire pressure controller to produce a compact and readily assembleable module for the system of the present invention.

DETAILED DESCRIPTION OF THE PREFERRED EMBODIMENT

Figure 1:
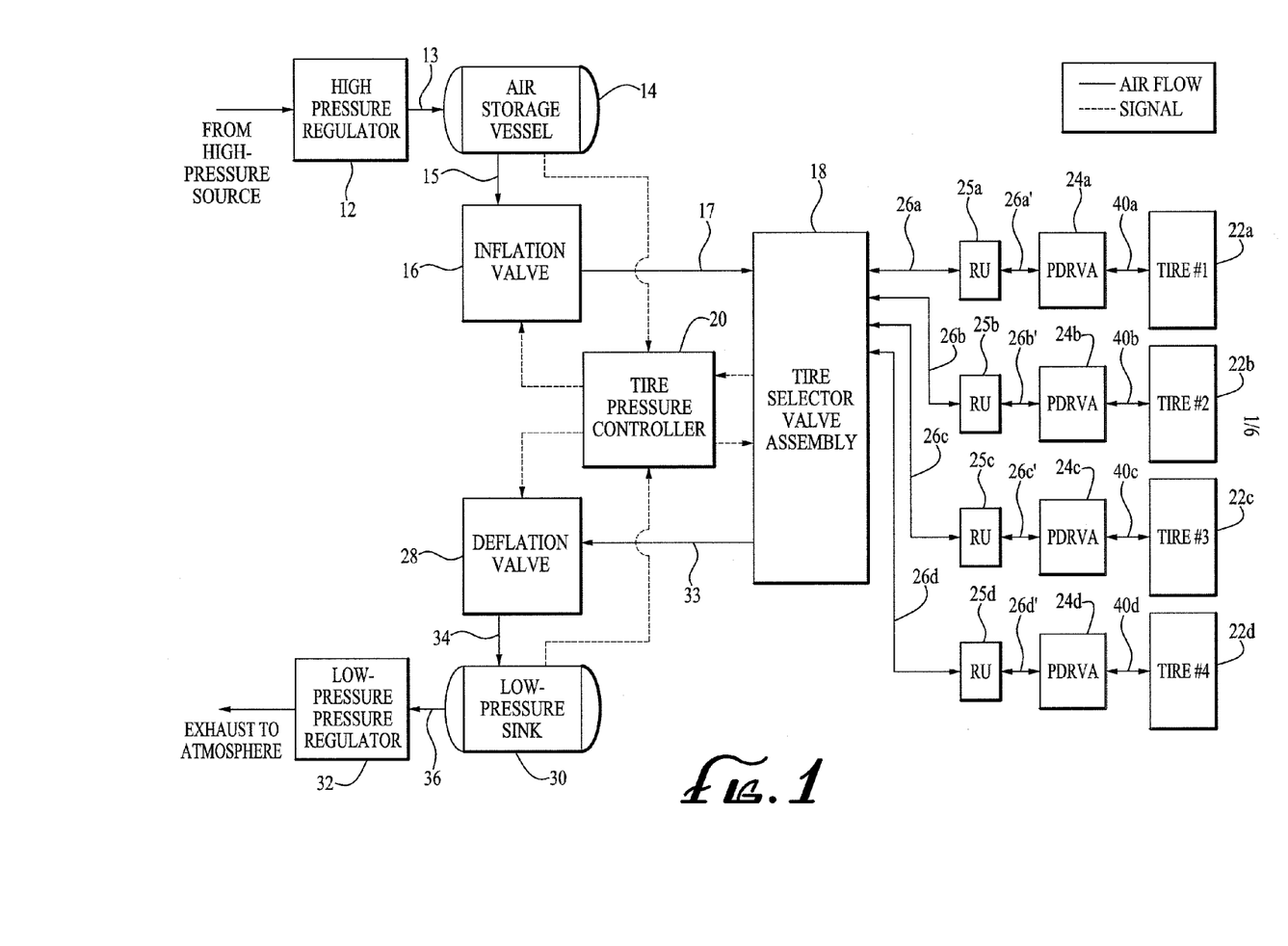
FIG. 1 is a schematic representation of the failure tolerant tire inflation system of the present invention.

An exemplary embodiment of a failure tolerant tire inflation system 10 of the present invention is schematically illustrated in FIG. 1. The system directs air under pressure from a high pressure source, typically an onboard compressor (not shown), to a pressure regulator 12 that reduces the air pressure to a level suitable for inflating the particular vehicle tires. By way of example, on a typical tractor trailer rig, the onboard compressor for providing air to the brakes both on the tractor and the trailer is directed to reserve air brake tanks (not shown) on the trailer and tractor and are set to maintain the air pressure within the tanks within the range of about 100 to 125 psig which generally corresponds to the range of typical inflation pressures in the tires used on large tractor trailers. Air from the air brake tank is first directed to the braking system to maintain the air pressure in the braking system at the normal brake system level of about 70 psig. Excess air is directed from the tank to the pressure regulator 12. Thus, pressure regulator 12 should be capable of handling pressures within the range of about 70 to 125 psig and preferably would be set to lower the pressure of the air coming from the air brake tank to the maximum operating pressure of the vehicle's tires which, by way of example only, could be about 105 psig. The "maximum operating pressure" is the highest pressure recommended for the tire(s) by the tire manufacturer.

From the pressure regulator 12, the air is directed through a conduit 13 to a relatively small storage vessel 14 that is in fluid communication via conduit 15 with a solenoid actuated tire inflation valve 16. Preferably, vessel 14 is sized to hold only about 20-30 ml. of air therein. The inflation valve 16 selectively communicates the pressurized air within storage vessel 14 via conduit 17 with a tire selector valve assembly 18. Both the tire inflation valve 16 and the tire selector valve assembly 18 are activated by a tire pressure controller 20 upon a need to check the pressure in the four tires 22a-22d carried by a pair of axles (not shown) or to inflate or deflate one or more of those tires as will be described. It is to be understood that the two axle, four tire model of the failure tolerant tire inflation system 10 illustrated in FIG. 1 is for explanatory purposes only and in actual practice, different multiple tire configurations, such as tandem tires wherein four tires are carried by a single axle, could be employed with single or multiple tire selector valves for different applications. Also, multiple systems or multiple partial systems (sharing one or more components) could be employed as, for example, on a tractor trailer.

Figure 3:
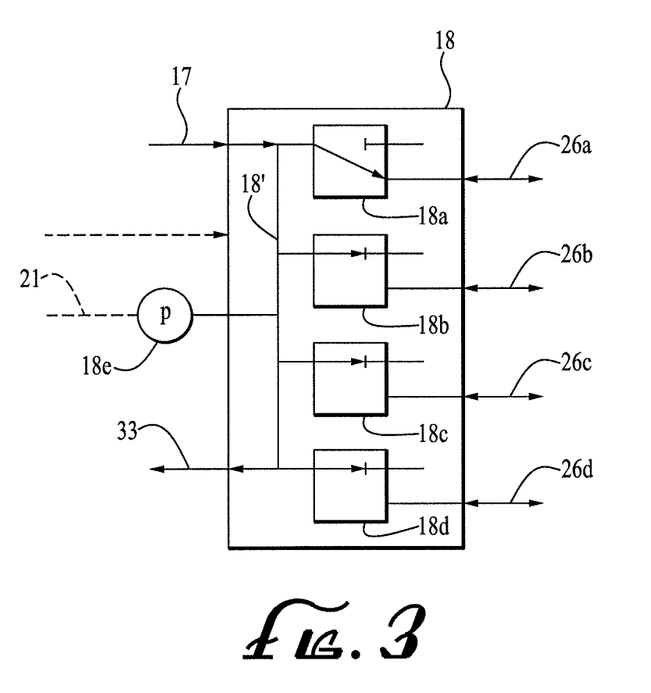
FIG. 3 is a schematic representation of a preferred embodiment of the tire selector valve employed in the system of the present invention.

In use, the tire pressure controller 20 periodically sequences from one tire to the next to check the pressure level in each tire associated with each tire selector valve assembly 18 and then inflates or deflates any of those tires, as needed, to maintain all of the tires at their desired tire operating pressure. A preferred configuration of selector valve assembly 18 is illustrated in FIG. 3. As illustrated therein and as will be discussed later herein, valve assembly 18 comprises a gallery of valves 18a-18d communicating with air conduit 17 through a common cavity 18' and with the individual tires 22a-22d through associated rotary union assemblies 25a-25d (see FIG. 1) and pressure difference reduction valve assemblies 24a-24d.

As is well known in the art of automatic tire inflation, a rotary union assembly enables a stationary conduit to sealably engage a rotating conduit and examples of such assemblies are found in the previously referenced U.S. Pat. Nos. 6,105,645, 7,418,989 and 7,896,045. In the illustrated example seen in FIG. 1, the rotary union assemblies, 25a-25d are disposed between the tire selector valve assembly 18 and the pressure difference reduction valve assemblies 24a-24d. While such a positioning of the rotary union assemblies is preferred, if desired, the rotary union assemblies could be located between the pressure difference reduction valve assemblies and the individual tires. In describing the system of the present invention herein, reference to the rotary union assemblies is frequently omitted as their presence is to be understood and their particular location is not critical.

Figure 2:
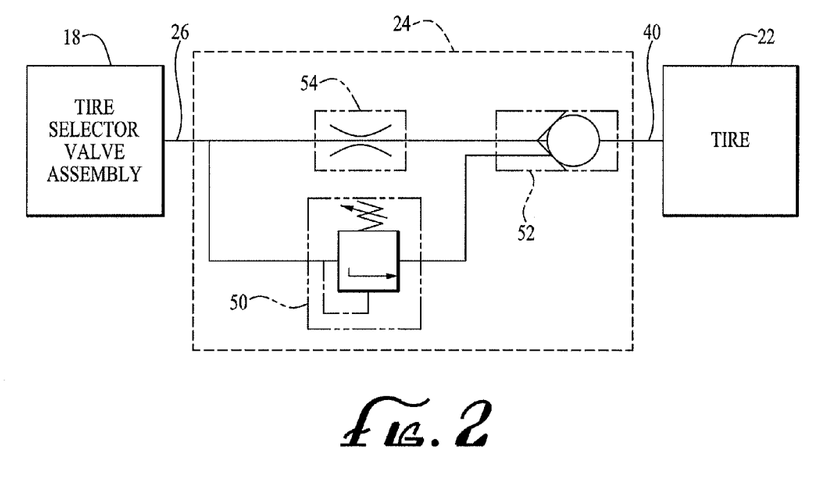
FIG. 2 is a schematic representation of a preferred embodiment of the pressure difference reduction valve assembly employed in the system of the present invention.

When the system 10 is activated, the controller 20 communicates the tire selector valve assembly 18 with the first tire to be checked, e.g. tire 22a, by opening tire selector valve 18a within the tire selector valve assembly 18 which communicates with tire 22a via the associated rotary union assembly 25a, pressure difference reduction valve assembly 24a and conduits 26a, 26a' and 40a (see FIG. 1). The remaining tire selector valves 18b-18d remain closed. The air pressure within the air storage vessel 14, which, as noted earlier, might be about 105 psig, is directed via conduit 17 to the tire selector valve assembly 18, preferably by modulating tire inflation valve 16. Modulation in this case is "pulse width modulation" and consists of cycling the tire inflation valve 16 ON and OFF with the "ON time" related to the amount of air needed to open valve assembly 24a so that the pressure level in the tire can be measured, as will be discussed. This modulation continues while the tire selector valve assembly 18 is open through valve 18a as illustrated in FIG. 3 and the pressure in the interior cavity 18' of the tire selector valve is raised to a level well above the minimum operating pressure for the tires. In the present example, the minimum tire operating pressure could be about 70 psig. Valve assembly 24a, which is illustrated schematically in FIG. 2, is configured to open upon detecting a minimum tire inflation pressure that is set at a level well above the tire's minimum operating pressure, e.g., about 78-80 psig. That pressure level is referred to herein as the minimum tire inflation pressure. For example, if the tires were designed for an optimal operating pressure of about 90 psig (which will be referred to herein as the "target pressure" or "target level") and had a minimum operating pressure of 70 psig, the minimum tire inflation pressure might be set at about 78-80 psig. These pressure levels are merely examples and will vary depending on the make and/or model of the tires and different operating conditions, primarily the load on the vehicle. With a heavy load, the target pressure, for example, would be higher. With the opening of the inflation valve 16, the pressure within cavity 18' quickly ramps up and as soon as the pressure within the cavity 18' reaches the minimum tire inflation pressure and tire selector valve 18a is opened, the pressure difference reduction valve assembly 24a that is in fluid communication with the tire being checked (22a) will open.

When the pressure difference reduction valve assembly 24a opens, the charged cavity 18' in the tire selector valve assembly 18 now communicates downstream with tire 22a, whereupon tire inflation valve 16 is closed and the tire selector valve assembly 18 can read the tire pressure level within tire 22a, which information is communicated to the tire pressure controller 20. A pressure transducer 18e can be provided in the tire selector valve assembly 18 (see FIG. 3) to measure the pressure level within tire 22a and transmit the tire pressure information to the controller 20 via a signal that is represented in FIG. 3 at 21. In the event the air pressure within the tire being checked is above the minimum tire inflation pressure necessary to open the individual pressure difference reduction valve assemblies, air from the tire will necessarily flow from the tire back through the open pressure difference reduction valve assembly to the tire selector valve assembly where the air pressure level is detected by the pressure transducer 18e and relayed to the controller. If the air pressure in the tire being checked is less than the minimum tire inflation pressure, air will flow through the pressure difference reduction valve assembly into the tire and the pressure transducer will relay to the controller a low tire pressure condition. The controller may then reopen and modulate the inflation valve 16 until the air pressure within cavity 18' rises to the target pressure (if a low tire pressure was detected) or open and modulate a deflation valve 28 (if an overinflated tire was detected) until the air pressure falls to the target pressure. Thereafter, the controller 20 closes the tire selector valve 18a, thereby isolating the pressure difference reduction valve assembly 24a and its associated vehicle tire 22a. If the measured tire pressure is at the desired level, valve 16 is closed by the controller and the deflation valve 28 is opened.

The deflation valve 28, like the tire inflation valve 16, is preferably solenoid actuated and activated by the controller 20 and can be communicated with a low pressure sink 30 and low pressure regulator 32, as illustrated in FIG. 1. The low pressure regulator 32 is set to a level slightly above the aforesaid minimum operating pressure, e.g. about 73-75 psig, and when the deflation valve 28 is opened, the cavity 18' in the tire selector valve assembly 18 communicates with the low pressure sink 30 and low pressure regulator 32 through the deflation valve 28 via conduits 33, 34 and 36.

Thus, upon the controller 20 closing the tire inflation valve 16 and opening and modulating the deflation valve 28, the air pressure within the cavity 18' of the tire selector valve assembly 18 is brought to a level slightly above the minimum operating pressure with excess pressure being exhausted to the atmosphere as illustrated in FIG. 1 such that upon reopening the tire selector valve 18a, the pressure difference reduction valve assembly 24a will close. The controller 20 then communicates the tire selector valve with valve assembly 24b via conduit 26b and the measuring of the tire pressure sequences to the next tire, i.e., tire 22b. By sequencing the coordinated activation and deactivation of the respective valves among each of the four tires 22a-22d, the pressures in each of the four tires fed by the tire selector valve assembly 18 are readily measured and forwarded to the controller 20.

In the event the controller 20 detects a low pressure in one of the tires 22a-22d during the aforesaid sequencing, the controller activates (opens) the tire inflation valve 16, closes the deflation valve 28 and recharges the internal cavity 18' in the tire selector valve assembly 18 with the higher pressure air from regulator 12 flowing through vessel 14 and then opens and modulates the inflation valve 16. The particular tire selector valve 18a, b, c or d associated with the detected underinflated tire is then opened by the controller 20 and the air in cavity 18' flows through the associated open pressure difference reduction valve assembly 24a, b, c or d to the underinflated tire 22a, b, c or d. The associated pressure difference reduction valve assembly 24a, b, c or d is open as the pressure of the incoming air at the valve would be at the target pressure (about 90 psig) which is above the minimum tire inflation pressure necessary to open valve assemblies 24a-d. Thus, the underinflated tire would be inflated periodically as the sequencing between the tires continued. In that manner, if more than one tire were deflated, the low pressure tires would be uniformly inflated so as to avoid leaving a single or last to be filled tire at a low pressure. The fill time for each tire should be set so as to be significantly longer than the time taken to measure the pressure for the tires, which is relatively quick. By way of example only, the time necessary to measure the pressure of each tire might be about 0.30 seconds, while the fill time for each tire in a single sequence through the four tires might be set to about ten seconds.

As an alternative to the above described periodic filling process, the controller 20 could be programmed to stop the tire to tire sequencing upon detecting an underinflated tire and hold valves 16 and 18 open to supply the tire with air pressure from the high pressure source through the regulator 12, vessel 14, inflation valve 16, tire selector valve assembly 18 and the aligned pressure difference reduction valve assembly 24 until the tire is inflated to its desired operating pressure. Only after the underinflated tire is filled would the sequencing continue. This alternative filling process provides a more rapid filling of the deflated tire than the periodic filling during sequencing. Again, with the deflation valve 28 closed, air at the target pressure (e.g. 90 psig) would be provided to the deflated tire, as described, through the associated pressure difference reduction valve assembly 24 which is at a higher pressure than the minimum tire inflation pressure and thus would hold the associated valve assembly 24 in an open position. Such a continuous filling procedure would be preferred in the event of the detection of only a single underinflated tire. When multiple tires are detected as being underinflated, a periodic inflation process, as previously described, may be preferred.

As discussed above, the pressure difference reduction valve assembly 24 employed in this failure tolerant tire inflation system of the present invention preferably is designed to open when supplied with air at a minimum tire inflation pressure level that is well above the safe low pressure limit for the tires (i.e., the minimum operating pressure) and to close when supplied with air at a pressure below that minimum tire inflation level. The pressure difference reduction valve assembly minimizes the pressure difference across the pilot operated check valve 52 when the valve assembly is open. This reduction of pressure drop allows pressure transducer 18e to accurately measure the tire pressure.

FIG. 2 illustrates a schematic representation of a pressure difference reduction valve assembly 24 utilizing conventional pneumatic valve symbols. The pressure difference reduction valve assemblies 24 each essentially comprise three components: an unloading valve 50, a pilot operated check valve 52 and an orifice 54. Valve assemblies 24 are supplied with air from the tire selector valve assembly 18 via conduits 26a-26d and communicate with the tires via conduits 40a-40d. The air flow from the tire selector valve assembly 18 through one of the pressure difference reduction valve assemblies 24 to a tire 22 passes through an orifice 54 and a pilot operated check valve 52. A significantly smaller amount of air from valve assembly 18 is directed to the unloading valve 50 within the valve assembly 24. The function of the unloading valve 50 is to open the associated check valve 52 at a relatively low pressure level relative to the target pressure within the tire. The unloading valve 50 can comprise a spring actuated piston that is set to open upon receiving a pressure above the minimum operating pressure, i.e., at about 78-80 psig in the above example. If a valve assembly 24 is supplied with low pressure air below the safe low limit pressure for the tire, i.e., the minimum tire inflation pressure, the unloading valve 50 remains closed as would the pilot operated check valve 52. If a valve assembly 24 is supplied with pressure well above the safe low limit pressure for the tire, e.g., above the minimum tire inflation pressure, the unloading valve 50 opens, as above described, and by utilizing a hydraulic or mechanical advantage, in turn opens the pilot operated check valve 52, allowing air flow through the valve assembly 24. Thus, the tire selector valve assembly 18 can be used to open or close the valve assemblies 24 for a selected tire by opening the inflation valve 16 or the deflation valve 28. The orifice 54 in each of the valve assemblies 24 prevents air from the tire from increasing the pressure of the pilot operated unloading valve 52 in the situation where the unloading valve is to be closed.

In the event system 10 detects a tire that is overinflated, i.e., the pressure within the tire is greater than the pressure set by regulator 12, when the associated pressure difference reduction valve assembly 24 is opened, air will flow back through the valve assembly 24 from the overinflated tire into the tire selector valve assembly 18. This high pressure back flow is detected by the controller 20 which then closes the inflation valve 16 and opens the deflation valve 28. The air flow from the overly inflated tire 22 is then conveyed to the low pressure sink 30 via conduits 33 and 34. The low pressure sink is maintained at a pressure level slightly above the minimum tire operating pressure which is a pressure suitable to allow flow from the tires for deflation, and above the manufacturer's safe low limit pressure for the tires as noted earlier herein. The deflation process is ended when the tire reaches the desired pressure sensed at the pressure transducer 18e as measured by the tire pressure controller 20. At that time, controller 20 closes the deflation valve 28 preventing further evacuation of air from the previously overinflated tire and preferably the tire selector valve communicating with the deflated tire as well.

Through the above described system 10, a failure of the pressure difference reduction valve assembly 24 to close or the failure of the deflation valve 28 to close will result in a tire being drained to the low pressure sink level but the tire retains a pressure above a safe low limit pressure for the tire. The same is true for a failure in the pressure regulation system or the other valves or conduits supplying the air to the tires. The failure of the tire pressure controller may also result in the failure of the deflation valve to close but retains the aforementioned protection assuring the tire retains a pressure above a safe low limit pressure for the tire. While failure of a conduit 40*a*-40*d* between the pressure difference reduction valve assemblies 24 and tires 22 could still result in a complete deflation of a tire, that conduit is relatively short and well protected from physical damage resulting in a low probability of such a failure.

As noted earlier herein, the system 10 illustrated in FIG. 1 communicates two tires on opposed ends of a pair of axles with one tire selector valve assembly 18 and with each tire having an associated pressure difference reduction valve assembly 24 disposed between that tire and its associated valve assembly 24. Such a configuration provides maximum monitoring and control over each tire and could be expanded to include two or more axles with each axle having a pair of tandem tires on each end thereof and each of the tires having an associated failure prevention valve 28 and communicating with a single or multiple tire selector valves.

Figure 1A:
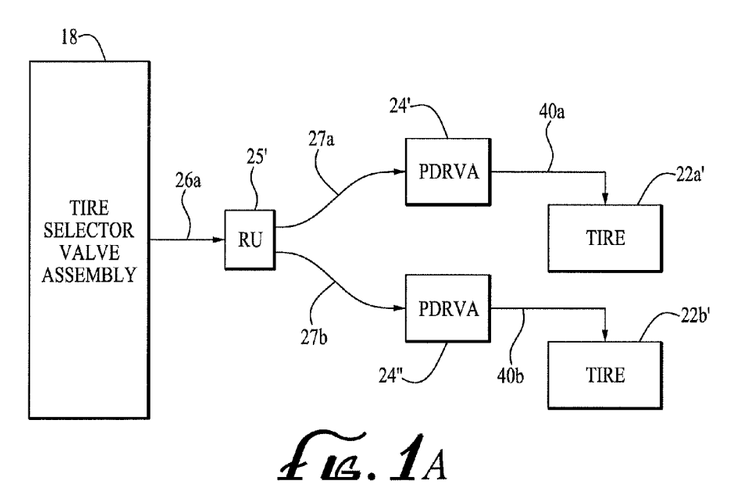
FIG. 1A is a schematic representation of a portion of the failure tolerant tire inflation system of the present invention used with pairs of tandem tires.

The relevant portion of one such system is schematically illustrated for a pair of tandem tires in FIG. 1A. A pair of tires 22*a*' and 22*b*' are mounted in tandem on each end of multiple axles and a single rotary union assembly 25' services the two adjacent tires in each pair of tires as opposed to a single tire in the system illustrated in FIG. 1. FIG. 1A only depicts the components associated with the two tires on one end of a single axle (not shown). As seen therein, conduit 26*a* communicates a tire selector valve in a tire selector valve assembly 18 with a rotary union assembly 25' as in the prior embodiment. The rotary union assemblies 25', however, are each configured to communicate the tire selector valve in assembly 18 with two pressure difference reduction valve assemblies 24' and 24", each of which is selectively communicable with one of the two tandem tires 22*a*' or 22*b*'. The rotary union assembly 25' simply splits the downstream portion of the rotary union assembly into two separate rotating conduits 27*a* and 27*b* as opposed to a single rotating conduit, e.g. 26*a*' as is the case with rotary union assemblies 25*a*-25*d* in the system illustrated in FIG. 1. The two rotating conduits 27*a* and 27*b* each communicate with one of the two separate pressure difference reduction valve assemblies 24' and 24" which in turn selectively communicate with the two tandem tires. Each pair of tandem tires is similarly communicated to the tire selector valve assembly via a common rotary union assembly and separate pressure difference reduction valve assemblies. Upstream of the tire selector valve assembly 18 (the left side of valve assembly 18 as seen in FIG. 1), the tire inflation system for pairs of tandem tires preferably comprises the same components and function in virtually the same manner as the system illustrated in FIG. 1. In such a system, the two tires in each tandem pair are checked for pressure level by a pressure transducer in the tire selector valve assembly and inflated or deflated together utilizing the same process as described herein with respect to a plurality of single tires in the system of FIG. 1. It is also understood that the tire inflation system of the present invention could readily accommodate axles having single and tandem tires on the same vehicle.

Alternatively, each pressure difference reduction valve assembly could service a pair of tandem tires and thereby cut in half the number of pressure difference reduction valve assemblies required for the system and significantly reduce the amount of air conduit needed for the system. In such a system, however, if a deflated tire was detected, the controller 20 may be incapable of identifying which of the two tires serviced by a single failure prevention valve was the deflated or overinflated tire. That determination may have to be made manually. Thus, such a system would not be preferred. Nevertheless, the driver would be made quickly aware of the condition by the system controller 20 so that the underinflated or overinflated tire(s) could be quickly identified for re-inflation and repair. In still other embodiments of the system, multiple tire selector valve assemblies could be employed. One such valve could be used on the tractor and associated with the tractor tires and valve assemblies 24 and another tire selector valve assembly 18 used on the trailer with its tires and associated valve assemblies 24. Also, multiple tire selector valves might be used each with its own associated pressure vessel 14, inflation valve 16, deflation valve assembly 18, low pressure sink 30 and low pressure regulator 32 but share a common regulator 12 and/or controller 20.

Figure 4:
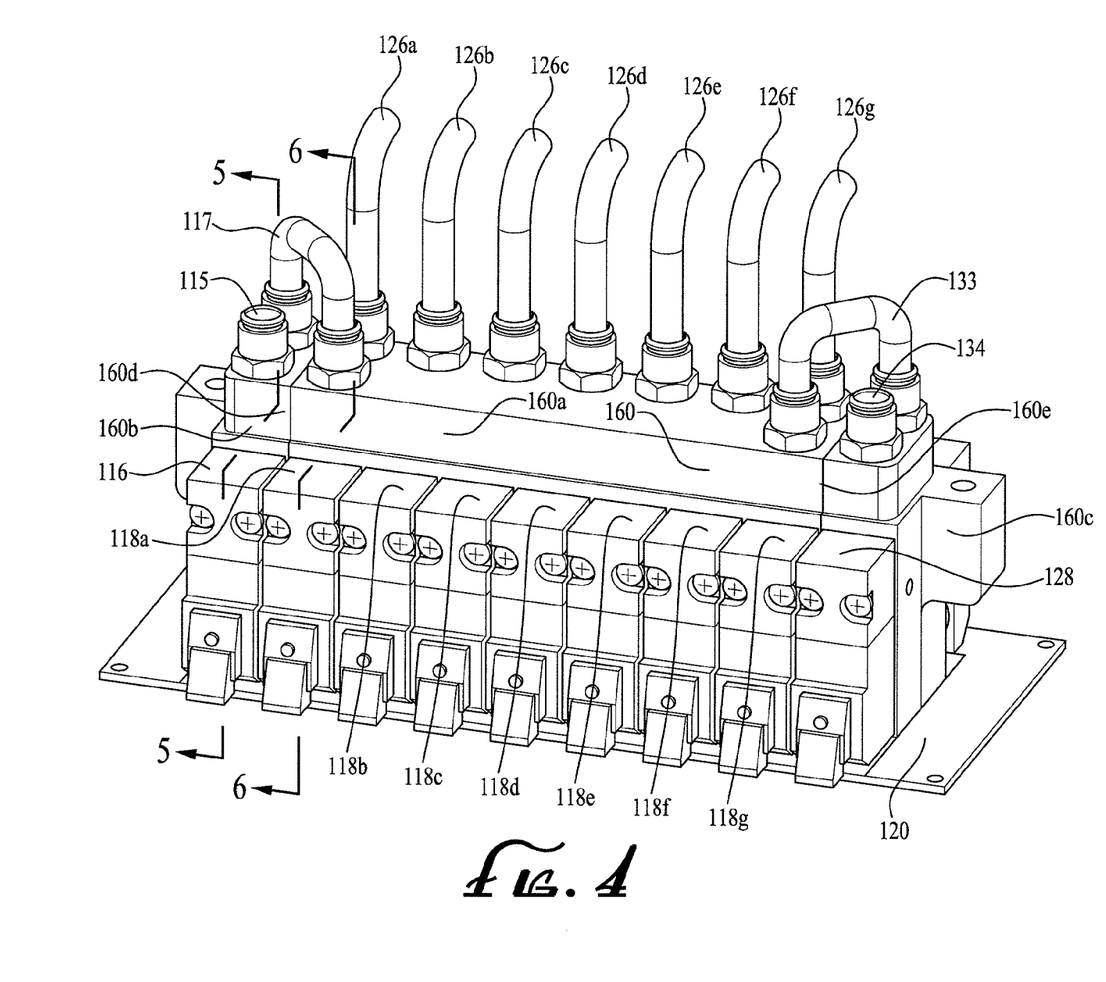
FIG. 4 is a perspective view of a preferred embodiment of a portion of the system of the present invention.

FIG. 4 illustrates an example of a portion of a preferred embodiment of an air inflation system 100 of the present invention wherein the illustrated components are provided in a compact disposition. As seen therein, the tire inflation valve 116, the valves 118*a*-118*g* comprising the tire selector valve assembly 118 and the deflation valve 128 are mounted to a manifold 160 that houses the necessary internal pneumatic passageways or conduits. Manifold 160 preferably is formed by joining together a central block 160*a* of aluminum and two smaller aluminum end blocks 160*b* and 160*c* with the cavities forming the air conduits or passageways and accommodating the various pressure regulators and valve mechanisms being drilled or otherwise formed therein. The three blocks are then joined together along seams 160*d* and 160*e* by a suitable fastening means. Sealing plugs (not shown) are preferably used to seal the ends of passageway 18' in the control manifold block 160*a*. Aluminum is a preferred material for blocks 160*a*-160*c* as it is easily machined, cost effective, durable and acts as an excellent heat sink for the controller. Other materials such as brass and durable plastics also could be used.

Conduits 126*a*-126*g* project from the manifold 160 as shown in FIG. 4 to direct the air to the associated tires or groups of tires through the pressure difference reduction valve assemblies which are located externally of the manifold and are not shown in FIG. 4. The inflation valve 116 and the deflation valve 128 are integrated to the manifold in the same manner as the tire selector valves 118*b*-118*g*, providing a compact structure and uniform assembly method. High pressure air is supplied to the manifold through conduit 115 and the tire inflation valve 116 controls flow from that source to the manifold cavity effectively comprised of conduits 117 and 118' (see FIG. 5) that are internal to the manifold 160 and communicate with each of valves 118*a*-118*g*. The deflation valve 128 controls air flow from the manifold cavity through passageway 133 to the low pressure sink conduit 134. A circuit board 120 comprising the tire pressure controller is mounted to the manifold 160 which provides direct electrical connections of the valves 116, 118*a*-118*g* and 128 and of the pressure transducer 118*e* to the circuit board controller 120.

Figure 5:
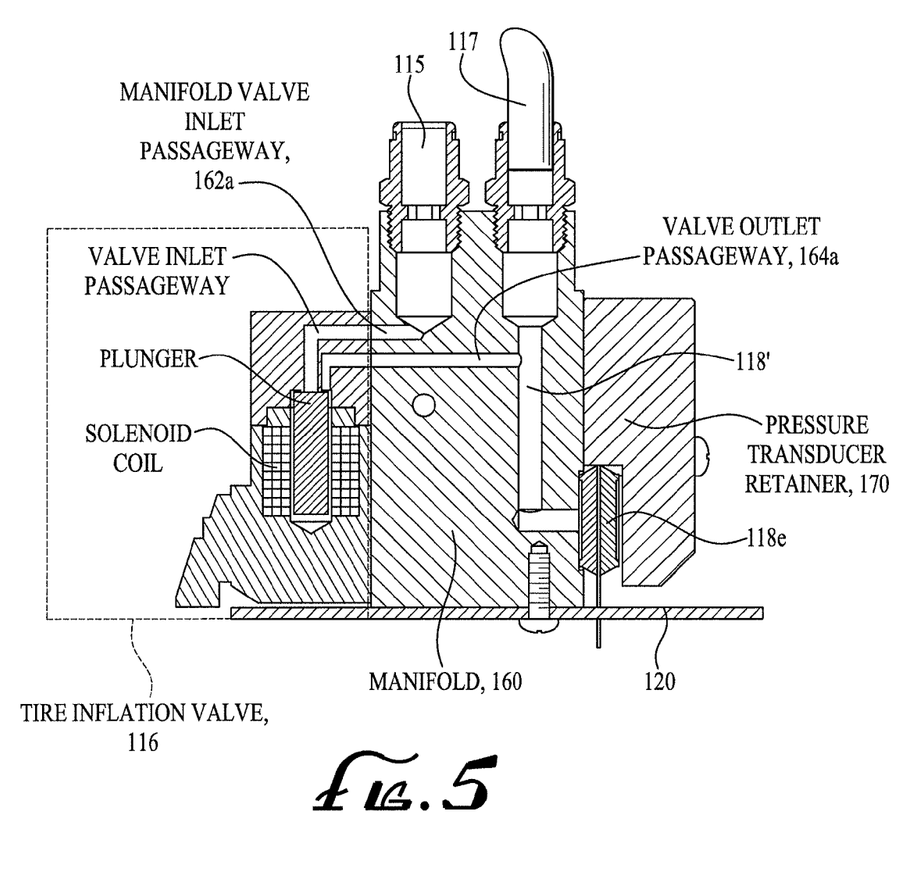
FIG. 5 is a sectional view taken along 5-5 of FIG. 4.

FIG. 5 is a cross-section taken along the line 5-5 of FIG. 4 and illustrating the tire inflation valve 116 employed in the compact embodiment of the invention illustrated in FIG. 4. High pressure air is supplied to the tire inflation valve 116 through conduit 115 which is in direct communication with the manifold valve inlet passageway 162. Passageway 162 communicates with valve inlet passageway 164. The inflation valve plunger 166 may be drawn downwardly by a magnetic force supplied by the inflation valve solenoid coil 168, opening the valve inlet passageway 162a to the valve outlet passageway 164a and allowing the manifold cavity 118' to be charged with high pressure air. Cavity 118' is in direct communication with the pressure transducer 118e allowing the manifold cavity pressure to be measured and communicated to the controller 120. The pressure transducer 118e is held in place within the pressure transducer retainer 170 and is soldered or otherwise electrically connected with the controller circuit board 120. As in the prior embodiment, portions of the manifold cavity 118' are connected by conduit 117 allowing air flow to the inlet sides of the individual tire selector valves 118a-118g (not shown in this view) just as the cavity 18' of the prior embodiment was communicated via conduit 17 with the inlet sides of tire selector valves 18a-18d.

Figure 6:
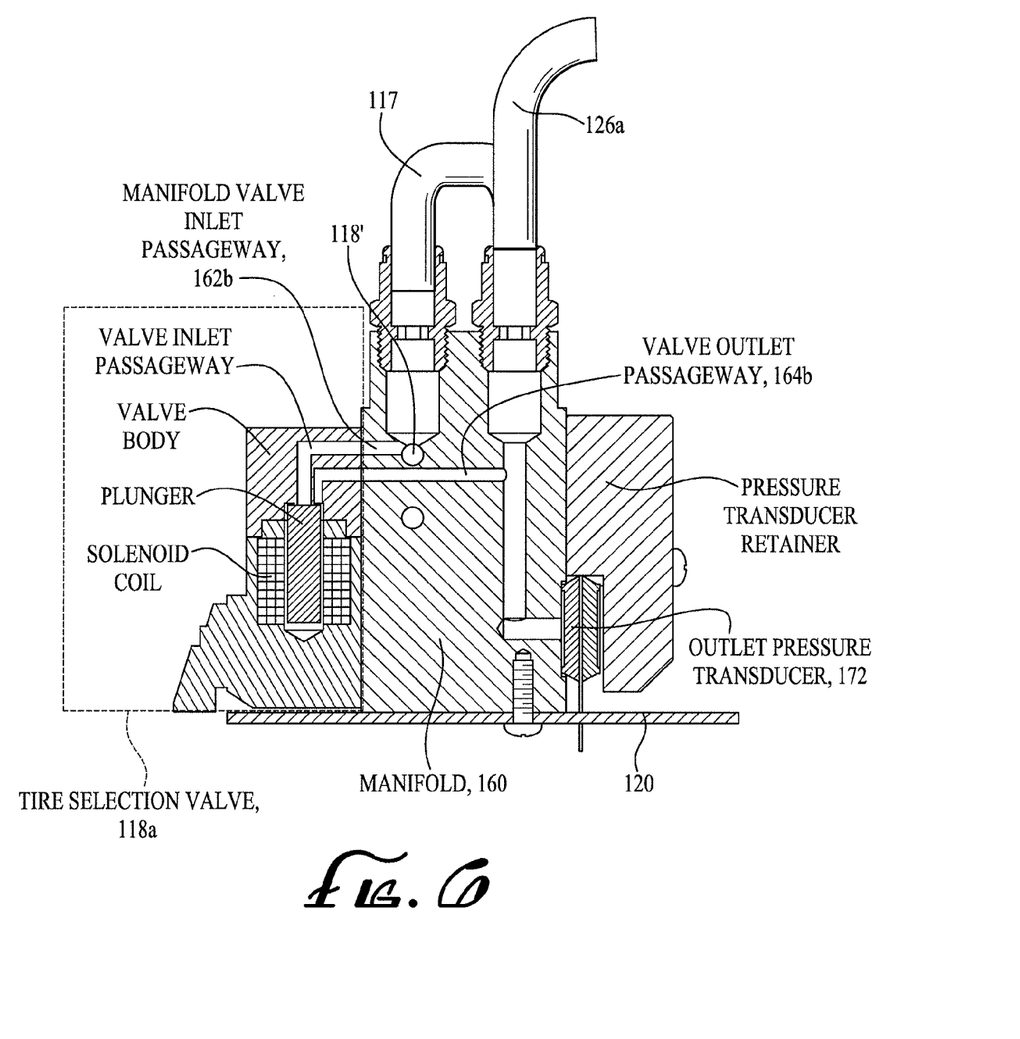
FIG. 6 is a sectional view along the line 6-6 of FIG. 4.

FIG. 6 is a cross-section taken along line 6-6 of FIG. 4 and illustrates the tire selector valve 118a and associated manifold section of the embodiment of the present invention illustrated in FIG. 4. Air from the tire inflation valve 116 is provided to the manifold cavity 118' and selector valve 118a (shown in the dashed line enclosed region) through conduit 117. The manifold cavity 118', which extends to all of the tire selector valves, communicates with the deflation valve through conduits 133 (see FIG. 4). The tire selector valve 118a may be opened to connect the manifold valve inlet passageway 162b to the manifold outlet passageway 164b as previously explained with reference to the tire inflation valve 16 employed in the system 10 illustrated in FIG. 1. The manifold outlet passageway 164b communicates with the associated tire, e.g., 22a, via conduit 126a. FIG. 6 illustrates a portion of conduit 126a extending from the manifold. The manifold cavity 118' also connects to an optional outlet pressure transducer 172 which may be included to allow tire pressure measurement at the outlet side of the tire selector valve. The optional pressure transducer 172 and tire selector valve 118a are both connected directly to the tire pressure controller 120.

Depending on a number of parameters, air storage vessel 14, low pressure sink 30 and the corresponding components in system 100 (not shown) may be of a relatively small capacity (e.g., about 20-30 ml.). Those parameters include the speed of the pressure regulators, pressure variations in the high pressure air supply that need to be accommodated, the rate at which air is delivered to the individual tires and the acceptable tire pressure tolerances. Where the pressure regulators are fast and encounter only small pressure variations in the high pressure air supply, the rate at which the air to be delivered to the individual tires is relatively low and the tire pressure tolerances are not overly exacting, the vessel 14 and sink 30 can be quite small as noted above and in some instances, can be formed as portions of a continuous conduit. For example, storage vessel 14 could be formed as a part of a conduit extending between the high pressure regulator 12 and the inflation valve 16 or 116 in lieu of conduits 13 and 15 and a separate vessel 14. Similarly, low pressure sink 30 could be formed as a continuous conduit extending between the deflation valve 28 or 128 and the low pressure regulator 32 in lieu of separate conduits 34, 36 and a separate tank or sink disposed therebetween.

Although the present invention has been described by way of exemplary embodiments, it should be understood that many changes and substitutions may be made by those skilled in the art in carrying out the present invention without departing from the spirit and the scope of the invention, which is defined by the appended claims. It is also to be understood that different vehicle tires have different ranges of operating pressures and that the various tire pressure levels set forth herein are examples only and are not intended to be limiting in any manner.

What is claimed is:

1. A failure tolerant tire inflation system for supplying pressurized air from an onboard source to a plurality of pneumatic tires on a moving vehicle in the event of a drop in pressure in one or more of the tires below a predetermined target level or a failure of the system, the system comprising:
   a tire inflation valve communicable with the onboard source of pressurized air;
   a tire selector valve assembly communicating with said tire inflation valve for selectively communicating air from said tire inflation valve with the vehicle tires;
   a plurality of pressure difference reduction valve assemblies, each of said assemblies communicating with at least one of the tires and selectively communicating with said tire selector valve assembly;
   a controller for selectively activating and deactivating said tire inflation valve to open and close said valve, said tire selector valve assembly and said plurality of pressure difference reduction valve assemblies to sequentially check the air pressure in the tires and direct air from said tire inflation valve to any tire in which the checked air pressure was below said predetermined target level; and
   means operatively connected to said controller for detecting the pressure level within one of said vehicle tires upon the opening of one of said pressure difference reduction valve assemblies communicating with said tire and communicating said pressure level to said controller and wherein said tires have predetermined maximum and minimum operating pressures, said pressure difference reduction valve assemblies are configured to open upon sensing a pressure at or above a predetermined minimum tire inflation pressure and to close upon sensing a pressure below said minimum tire inflation pressure, said minimum tire inflation pressure being above said minimum tire operating pressure.

2. The failure tolerant tire inflation system of claim 1 including a pressure regulator for delivering air from said source to said tire inflation valve at a pressure proximate said maximum tire operating pressure, said controller, by activating said tire inflation valve and effecting delivery of air through said tire inflation valve to said tire selector valve assembly at said minimum tire inflation pressure and sequentially directing said air from said tire selector valve assembly to each of said pressure difference reduction valve assemblies, sequentially opens and closes each of said valve assemblies for the checking of the pressure levels in each of the tires by said means and upon said means detecting a tire pressure level less than said target pressure and communicating said level to said controller, said controller activates said tire inflation valve to inflate said tire to said target pressure.

3. The failure tolerant tire inflation system of claim 2 including a tire deflation valve operatively connected to said controller and selectively communicable with said tire selector valve assembly for releasing air therethrough from any tire in which the air pressure was detected by said means to be above said predetermined target level.

4. The failure tolerant tire inflation system of claim 1 wherein said tire selector valve assembly comprises a plurality of tire selector valves and a valve cavity, said cavity communicating with each of said tire selector valves and being selectively communicable with said tire inflation valve in response to the opening and closing of said tire inflation valve and wherein each of said tire selector valves communicates with one of said pressure difference reduction valve assemblies whereby air flow from said tire inflation valve to one of said tires is effected by the opening of said tire inflation valve and one of said tire selector valves by said controller, said one tire selector valve being communicable with a pressure difference reduction valve assembly communicating with said one tire.

5. The failure tolerant tire inflation system of claim 1 including a tire deflation valve operatively connected to said controller and selectively communicable with said tire selector valve assembly for releasing air therethrough from any tire in which the air pressure was detected by said means to be above said predetermined target level.

6. The failure tolerant tire inflation system of claim 5 including a plurality of rotary union assemblies, one rotary union assembly being disposed between each of said pressure reduction valve assembly and said tire selector valve assembly.

7. The failure tolerant tire inflation system of claim 5 including a low pressure sink and a low pressure regulator, said sink communicating said deflation valve with said low pressure regulator and said low pressure regulator maintaining a pressure level within said sink below said minimum tire inflation pressure whereby upon said means detecting an underinflated tire having a pressure below said predetermined target level and communicating said underinflated level to said controller, said controller activates said tire inflation valve directing air to said tire selector valve assembly and communicates said tire selector valve assembly with said underinflated tire to direct air from said tire inflation valve into said underinflated tire and inflates said tire to said predetermined target level or upon said means detecting an overinflated tire having a pressure above said predetermined target level and communicating said overinflated level to said controller, said controller deactivates said tire inflation valve and activates said tire reduction valve, allowing air flow from said tire to and from said low pressure sink until said pressure within said overinflated tire drops to said predetermined target level.

8. The failure tolerant tire inflation system of claim 5 including an air storage vessel, a pressure regulator communicating said source with said vessel for delivering air to said vessel at or about a predetermined maximum operating pressure for said tires and wherein the inflation valve communicates with said vessel.

9. The failure tolerant tire inflation system of claim 8 wherein said storage vessel comprises a conduit communicating said pressure regulator with said tire inflation valve.

10. The failure tolerant tire inflation system of claim 1 including a plurality of rotary union assemblies, one rotary union assembly being disposed between each of said pressure reduction valve assembly and said tire selector valve assembly.

11. The failure tolerant tire inflation system of claim 1 wherein said controller is operatively connected to said tire inflation valve and to said tire selector valve assembly to selectively open and close said pressure difference reduction valve assemblies and thereby sequentially communicate said means with said tires for the detecting of the pressure levels in the tires by said means and to direct air from said tire inflation valve to any tire in which the detected air pressure was below said predetermined target level and a tire deflation valve operatively connected to said controller and selectively communicable with said tire selector valve assembly for releasing air therethrough from any tire in which the air pressure was detected to be above said predetermined target level.

12. A failure tolerant tire inflation system for supplying pressurized air from an onboard source to a plurality of pneumatic tires on a moving vehicle in the event of a drop in pressure in one or more of the tires below a predetermined target level or a failure of the system, the system comprising:
a tire inflation valve communicable with the onboard source of pressurized air;
a tire selector valve assembly communicating with said tire inflation valve for selectively communicating air from said tire inflation valve with the vehicle tires;
a plurality of pressure difference reduction valve assemblies, each of said assemblies communicating with at least one of the tires and selectively communicating with said tire selector valve assembly;
a controller for selectively activating and deactivating said tire inflation valve to open and close said valve, said tire selector valve assembly and said plurality of pressure difference reduction valve assemblies to sequentially check the air pressure in the tires and direct air from said tire inflation valve to any tire in which the checked air pressure was below said predetermined target level;
means operatively connected to said controller for detecting the pressure level within one of said vehicle tires upon the opening of one of said pressure difference reduction valve assemblies communicating with said tire and communicating said pressure level to said controller; and
an air storage vessel, a pressure regulator communicating said source with said vessel for delivering air to said vessel at or about a predetermined maximum operating pressure for said tires and wherein said tire inflation valve communicates with said vessel.

13. The failure tolerant tire inflation system of claim 12 wherein said storage vessel comprises a conduit communicating said pressure regulator with said tire inflation valve.

14. A failure tolerant tire inflation system for supplying pressurized air from an onboard source to a plurality of pneumatic tires on a moving vehicle in the event of a drop in pressure in one or more of the tires below a predetermined target level or a failure of the system, the system comprising:
a tire inflation valve communicable with the onboard source of pressurized air;
a tire selector valve assembly communicating with said tire inflation valve for selectively communicating air from said tire inflation valve with the vehicle tires;
a plurality of pressure difference reduction valve assemblies, each of said assemblies communicating with at least one of the tires and selectively communicating with said tire selector valve assembly;
a controller for selectively activating and deactivating said tire inflation valve to open and close said valve, said tire selector valve assembly and said plurality of pressure difference reduction valve assemblies to sequentially check the air pressure in the tires and direct air from said tire inflation valve to any tire in which the checked air pressure was below said predetermined target level;

means operatively connected to said controller for detecting the pressure level within one of said vehicle tires upon the opening of one of said pressure difference reduction valve assemblies communicating with said tire and communicating said pressure level to said controller; and a low pressure sink and a low pressure regulator, said sink communicating said tire deflation valve with said low pressure regulator and said low pressure regulator maintaining a pressure level within said sink below a minimum tire inflation pressure whereby the opening and closing said tire inflation and deflation valves by said controller selectively opens and closes said pressure difference reduction valve assemblies to inflate or deflate a tire to maintain said tire at or about said predetermined target level.

15. The failure tolerant tire inflation system of claim 14 wherein said controller is operatively connected to said tire inflation valve and to said tire selector valve assembly to selectively open and close said pressure difference reduction valve assemblies and thereby sequentially communicate said means with said tires for the detecting of the pressure levels in the tires by said means and to direct air from said tire inflation valve to any tire in which the detected air pressure was below said predetermined target level.

16. A failure tolerant tire inflation system for supplying pressurized air from an onboard source to a plurality of pneumatic tires on a moving vehicle in the event of a drop in pressure in one or more of the tires below a predetermined target level or a failure of the system and wherein the vehicle tires are comprised of a plurality of pairs of tandem tires, the system comprising:

a tire inflation valve communicable with the onboard source of pressurized air;

a tire selector valve assembly communicating with said tire inflation valve for selectively communicating air from said tire inflation valve with the vehicle tires;

a plurality of pressure difference reduction valve assemblies, each of said assemblies communicating with at least one of the tires and selectively communicating with at least one tire selector valve assembly;

a plurality of rotary union assemblies, each of said rotary union assembly selectively communicating with a tire selector valve assembly and with a pair of said pressure difference reduction valve assemblies, said pressure difference reduction valve assembly in each of said pairs thereof selectively communicating with one tire in each of said pair of tandem tires;

a controller for selectively activating and deactivating said tire inflation valve to open and close said valve, said tire selector valve assembly and said plurality of pressure difference reduction valve assemblies to sequentially check the air pressure in the tires and direct air from said tire inflation valve to any tire in which the checked air pressure was below said predetermined target level; and means operatively connected to said controller for detecting the pressure level within one of said vehicle tires upon the opening of one of said pressure difference reduction valve assembly communicating with said tire and communicating said pressure level to said controller; and wherein said tires have predetermined maximum and minimum operating pressures, said pressure difference reduction valve assemblies are configured to open upon sensing a pressure at or above a predetermined minimum tire inflation pressure and to close upon sensing a pressure below said minimum tire inflation pressure, said minimum tire inflation pressure being above said minimum tire operating pressure.

17. The failure tolerant tire inflation system of claim 16 including a tire deflation valve operatively connected to said controller and selectively communicable with said tire selector valve assembly for releasing air therethrough from any tire in which the air pressure was detected by said means to be above said predetermined target level.

18. A failure tolerant tire inflation system for supplying pressurized air from an onboard source to a plurality of pneumatic tires on a moving vehicle in the event of a drop in pressure in one or more of the tires below a predetermined target level or a failure of the system, the system comprising:

a tire inflation valve communicable with the onboard source of pressurized air;

a tire selector valve assembly communicating with said tire inflation valve for selectively communicating air from said tire inflation valve with the vehicle tires;

a plurality of pressure difference reduction valve assemblies, each of said assemblies communicating with at least one of the tires and selectively communicating with said tire selector valve assembly;

a controller for selectively activating and deactivating said tire inflation valve to open and close said valve, said tire selector valve assembly and said plurality of pressure difference reduction valve assemblies to sequentially check the air pressure in the tires and direct air from said tire inflation valve to any tire in which the checked air pressure was below said predetermined target level; and means operatively connected to said controller for detecting the pressure level within one of said vehicle tires and communicating said pressure level to said controller, said pressure difference reduction valve assemblies being configured to open upon the means for detecting the pressure level detecting a pressure at or above a predetermined tire inflation pressure and to close upon the means for detecting the pressure level detecting a pressure below said predetermined tire inflation pressure.

19. The failure tolerant tire inflation system of claim 18 wherein said tires have predetermined maximum and minimum operating pressures and including a pressure regulator for delivering air from said source to said tire inflation valve at a pressure proximate said maximum tire operating pressure, said controller, by activating said tire inflation valve and effecting delivery of air through said tire inflation valve to said tire selector valve assembly at said predetermined tire inflation pressure and sequentially directing said air from said tire selector valve assembly to each of said pressure difference reduction valve assemblies, sequentially opens and closes each of said valve assemblies for the checking of the pressure levels in each of the tires by said means and upon said means detecting a tire pressure level less than said target pressure and communicating said level to said controller, said controller activates said tire inflation valve to inflate said tire to said target pressure.

20. The failure tolerant tire inflation system of claim 18 wherein said tires have predetermined maximum and minimum operating pressures and including an air storage vessel, a pressure regulator communicating said source with said vessel for delivering air to said vessel at or about a predetermined maximum operating pressure for said tires and wherein said tire inflation valve communicates with said vessel.

21. The failure tolerant tire inflation system of claim 18 wherein said tires have predetermined maximum and minimum operating pressures and including a low pressure sink and a low pressure regulator, said sink communicating said tire deflation valve with said low pressure regulator and said low pressure regulator maintaining a pressure level within said sink below said minimum tire inflation pressure whereby the opening and closing said tire inflation and deflation valves by said controller selectively opens and closes said pressure difference reduction valve assemblies to inflate or deflate a tire to maintain said tire at or about said predetermined target level.

22. The failure tolerant tire inflation system of claim 18 wherein said tires have predetermined maximum and minimum operating pressures and including a tire deflation valve operatively connected to said controller and selectively communicable with said tire selector valve assembly for releasing air therethrough from any tire in which the air pressure was detected by said means to be above said predetermined target level, a low pressure sink and a low pressure regulator, said sink communicating said deflation valve with said low pressure regulator and said low pressure regulator maintaining a pressure level within said sink below said minimum tire inflation pressure whereby upon said means detecting an underinflated tire having a pressure below said predetermined target level and communicating said underinflated level to said controller, said controller activates said tire inflation valve directing air to said tire selector valve assembly and communicates said tire selector valve assembly with said underinflated tire to direct air from said tire inflation valve into said underinflated tire and inflates said tire to said predetermined target level or upon said means detecting an overinflated tire having a pressure above said predetermined target level and communicating said overinflated level to said controller, said controller deactivates said tire inflation valve and activates said tire reduction valve, allowing air flow from said tire to and from said low pressure sink until said pressure within said overinflated tire drops to said predetermined target level.

\* \* \* \* \*